May 1, 1962

E. S. PRESTON 3,031,761

HORIZONTAL MEASURING AND INDICATING MECHANISM
FOR PHOTOGRAMMETRY INSTRUMENT

Filed Dec. 30, 1957

INVENTOR.
EVERETT S. PRESTON
BY
ATTORNEY.

May 1, 1962

E. S. PRESTON 3,031,761

HORIZONTAL MEASURING AND INDICATING MECHANISM
FOR PHOTOGRAMMETRY INSTRUMENT

Filed Dec. 30, 1957

INVENTOR.
EVERETT S. PRESTON

BY

ATTORNEY.

United States Patent Office 3,031,761
Patented May 1, 1962

3,031,761
HORIZONTAL MEASURING AND INDICATING MECHANISM FOR PHOTOGRAMMETRY INSTRUMENT
Everett S. Preston, Columbus, Ohio, assignor to Photronix, Inc., Columbus, Ohio, a corporation of Ohio
Filed Dec. 30, 1957, Ser. No. 705,960
2 Claims. (Cl. 33—1)

The present invention relates to improvements in photogrammetry instruments of the type comprising a map table, means to project photographed terrain onto the map table, a plotting table movable over the surface of the map table and carrying a relatively small screen onto which portions of the images are projected, the screen having a reference point thereon whereby the distance moved by the plotting table over the map table to shift the screen's reference point from registration with one point to another on the images is indicative of the horizontal distance between corresponding points on the photographed terrain. The present invention relates to an improved mechanism for measuring and indicating such horizontal movements of the plotting table from a given point, referred to as the "zero" position.

An object of the invention is the provision of an improved horizontal measuring and indicating mechanism of the type described comprising a registering counter device driven according to movements of the plotting table relative to the map table, and means to move the indicating units of the register independently of the plotting table and map table so that the register may be set at a zero reading for any given position of the plotting table relative to the map table.

A more specific object of the invention is the provision of an improved horizontal measuring and indicating mechanism of the type described comprising a track assembly, which may be selectively positioned on the map table corresponding to the direction the horizontal measurements are to be taken, and which has a guide member carried thereby for movement along the track and which is attached to the plotting table whereby the latter shifts the guide member, and the distance of travel thereof being indicated by a suitable registering counter driven according to relative movements between the guide member and the track, and means to move the indicating mechanism of the register independently of relative movement between the guide member and track so that the register may be set at a zero reading for any given position of the guide member relative to the track.

Another and more specific object of the invention is the provision of a horizontal measuring and indicating mechanism of the character mentioned comprising a track assembly having a bar on which a guide member is slidingly mounted and which may be attached to the plotting table of the photogrammetry instrument of the type described, the bar being horizontally supported above the map table, an indicating device carried on the assembly and driven by friction drive means operated by relative movement of guide member and bar, and means to selectively lock the friction drive means and for manually driving the indicating device to zero position while the drive is locked by causing slippage between drive members of the driving means.

Other objects and advantages of the invention will be apparent from the following description of a preferred form of the invention, reference being made to the accompanying drawing wherein.

Figure 1:
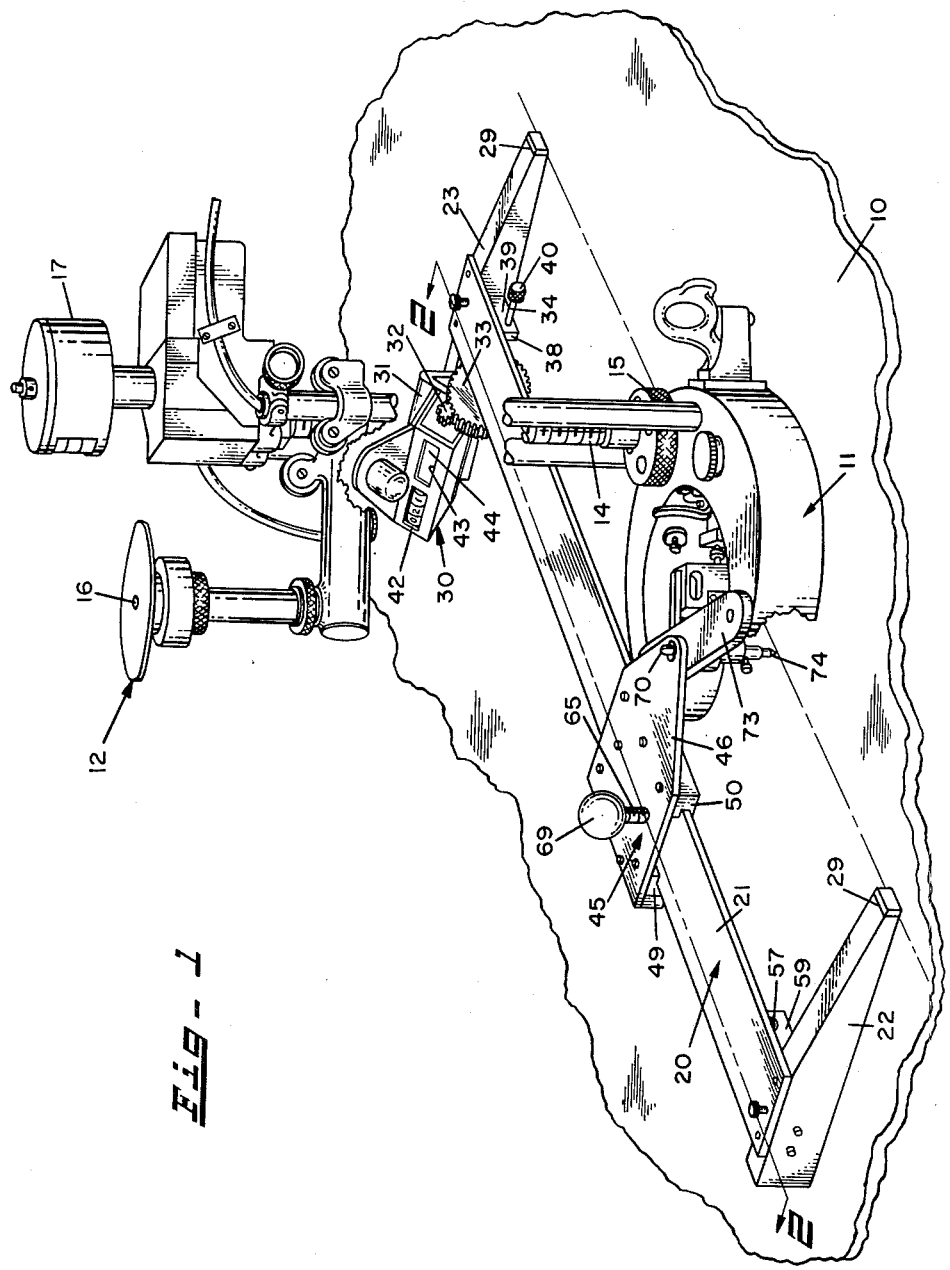
FIG. 1 is a fragmentary view of a photogrammetry instrument embodying the invention, certain parts being shown broken away.

In the form of the invention shown, the improved horizontal measuring device is incorporated in a photogrammetry instrument similar to that shown in U.S. Patent 2,492,870 and which includes a map table 10, onto which images of terrain are projected by suitable stereopticon type projectors, not shown, and a plotting table 11 which rests on the surface of the map table. The plotting table 11 includes a circular screen 12 carried thereon by a micro-screw 14 by which the elevation of the screen relative to the table may be finely adjusted by rotation of a wheel 15 to bring portions of the projected images into focus on the screen, all of which is well understood in the art. As is usual, screen 12 has a pin point opening 16 therein through which light from an electric lamp inside the supporting stem for the screen may be seen and which provides a reference point on the screen so that by moving the plotting table over the surface of the map table, any given point on the images may be exactly located at the reference point whereby exact measurements may be effected, all of which is well known in the art. The elevation of the screen 12 is indicated by a suitable registering device 17 driven by screw 14; the details of this registering mechanism have no bearing on the present invention and the details thereof are therefore omitted.

Figure 2:
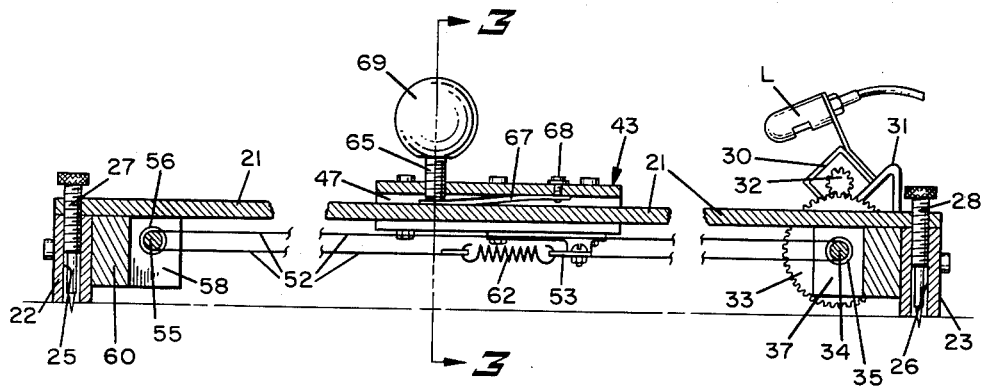
FIG. 2 is a sectional view taken along line 2—2 of FIG. 1, but on a larger scale; and, FIG. 3 is a sectional view taken on line 3—3 of FIG. 2, but on a larger scale.

The horizontal movements of plotting table 11 are measured and registered by a device including a track assembly 20 comprising a relatively rigid flat bar 21 attached to two standard blocks 22, 23. The standard blocks 22, 23 rest on the surface of map table 10 and preferably, openings 25, 26 are formed therethrough and locating pins 27, 28 are threaded into the respective openings, as shown in FIG. 2. The upper ends of the locating pins have suitable knobs thereon and the lower ends are pointed so that they may be driven into the surface of the map table by rotating the pins to thread them into the openings, and the points may be withdrawn from the table surface by turning the pins in the opposite direction. Thus, the track assembly can be secured by the pins against accidental shifting. In the form of the invention shown, standards 22, 23 have aligned guide markers 29 thereon which can be aligned with any given line on the map table to obtain horizontal readings along that line.

A registering counter device 30 is attached to standard 23 by a bracket 31, and the drive for the counter includes a pinion 32 driven by a gear 33 attached to a shaft 34 journaled in two roller bearings 35, only one of which appears in the drawings, supported in opposed walls 37, 38 formed by slotting a block 39 which is attached to the underside of bar 29 and the inside of standard 23. Shaft 34 projects beyond block 38 and has a knob 40 attached thereto by which the registering unit can be hand set to its zero reading, as explained more fully hereinafter.

The registering device 30 has two windows 42, 43 through which two sets of drum type registers are visible, one set indicating the units of angular movement of shaft 34 in one direction from a zero position and the other set indicating units of angular movement of the shaft in the opposite direction from the zero position. Both windows of the registering device have shutters, one of which is shown at 44, which are arranged to close the respective windows of whichever set of units is operating in the negative aspect relative to the zero position of the register so that the only readings visible are those which indicate the units of movement of shaft 34 corresponding to angular movement thereof to one side or the other of the zero position, the purpose of which will become apparent as the description procedes. Registering devices like that described are readily available commercially and one such registering unit is the Durant "Y" type Counter No. 3-3-Y-8831 R-AC, manufactured by Durant Manufacturing Company of Milwaukee, Wisconsin. Preferably, a suitable electric lamp L is provided to illuminate the face of the registering device.

Figure 3:
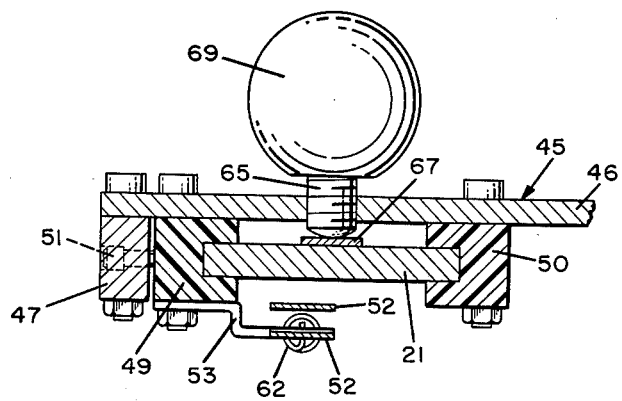

A guide member 45 is slidingly supported on bar 21 and comprises a top plate 46 having a depending end wall 47 attached thereto. Two parallel bearing members 49, 50 are attached to the underside of plate 46 by bolts, as shown, and are grooved to receive opposite edge portions of bar 21, as is clearly seen in FIG. 3. Preferably, members 49, 50 are formed of material having a low coefficient of friction, such as nylon. Wall 47 has a threaded opening in which a set screw 51 is threaded which is tightened against member 49 so that the reaction thereof acting through plate 46 urges the members 49, 50 into snug fitting with edges of bar 21.

One end of a thin flexible metal belt 52 is connected to a bracket 53 attached to member 49 and the belt is reeved about shaft 34 and a stub shaft 55 journaled in two roller bearings 56, 57 located in opposite wall portions 58, 59 of a slotted block 60 attached to the underside of bar 21 and standard 22. The opposite end of belt 52 is attached to a tension spring 62 anchored to bracket 53, as may be seen in FIG. 2. Belt 52 is thereby resiliently urged into frictional driving relation with shaft 34 at all times and elongation and contraction of the belt due to temperature variations has no appreciable affect on the tension thereof on shaft 34. It is also apparent that movement of guide member 43 along bar 21 causes belt 52 to drive shaft 34 and the pinion of registering device 30 in one direction or the other, depending upon the direction of its movement.

In practice, the units registered by device 30 may read in feet and tenths thereof to indicate the distance on the corresponding terrain.

The guide member 45 may be locked at any selected position along bar 21 by a screw 65 which is threaded in an opening through plate 46, and the lower end of the screw engages a brake plate or strap 67 which comprises a strip of metal having one end attached to the underside of plate 46 by a bolt 68 having the other end biased upwardly to maintain engagement with the lower end of screw 65 but may be forced against the upper face of bar 21 by screw 65 which may be turned manually by a knob 69 attached to the upper end thereof.

Guide member 43 is attached to plotting table 11 by a pin 70 attached to a bar 73 connected across the open end of the base of plotting table 11, the pin extending into an opening through an extended edge of plate 46, as may be clearly seen in FIG. 1. Thus, as the plotting table is moved parallel to bar 21, member 43 is moved along the bar and drives registering device 30, which indicates the units of movement in either direction from a given zero position. The center or axis of pin 70 coincides with a vertical axis through opening 16 in screen 12 as well as passing through a straight line extending through marks 29 on standards 22, 23 and a stylus 74 indicates the position of this axis on the map table.

In use, the track assembly 20 is positioned on map table 10 with the marks 29 in line with the line on which it is desired to take readings, and pins 27, 28 are then set to secure the assembly in position on the table, as described. The plotting table 11, connected to guide member 43, is moved along bar 21 until stylus 74 is positioned at a suitable starting or working point, referred to as the "zero position," and, as an example, may be the centerline of a proposed roadway extending at right angles to the line through markers 29. Set screw 65 is then turned to clamp guide member 43 to bar 21 and setting knob 40 of the registering device is then rotated manually to set the registering mechanism of the device 30 to the zero position. As explained previously, the drive belt 52 for the registering device is attached to guide member 43 and therefore the belt cannot be moved by rotation of shaft 43 to which knob 40 is attached, and consequently shaft 34 slips relative to the belt during the setting of the registering device to the zero position. Set screw 65 is then released and movement of member 43 by shifting of plotting table 11 is registered on device 30 according to the direction and magnitude of movement from the zero position. It will be seen that the zero position can be easily established at any position along bar 21, as described.

Although but one form of the invention has been described, it is to be understood that other forms, modifications and adaptations could be made all of which fall within the scope of the following claims.

I claim:

1. The combination of a plotting table adapted to be shifted along the map table of a photogrammetric instrument of the character described and a horizontal guide and measuring mechanism, said plotting table including a screen to receive projected images and a reference point on said screen, said mechanism comprising a bar having standards for supporting the bar above the map table surface, said bar being freely positionable relative to the map table, a guide member carried by said bar and movable in a guided path therealong, and means to pivotally attach said plotting table to said guide member whereby said member serves to guide said plotting table along said bar, the axis of the pivotal connection provided by said means lying in alignment with said reference point on said screen.

2. The combination of a plotting table adapted to be shifted along the map table of a photogrammetric instrument of the character described and a horizontal guide and measuring mechanism, said plotting table including a screen to receive projected images and a reference point on said screen, said mechanism comprising a bar having standards for supporting the bar above the map table surface, said bar being freely positionable relative to the map table, a guide member carried by said bar and movable in a guided path therealong, means to pivotally attach said plotting table to said guide member on an axis in alignment with said reference point on said screen, and a stylus forming a point of reference with the surface of the map table on which said bar is supported and having the indicating point thereof in alignment with said axis.

References Cited in the file of this patent

UNITED STATES PATENTS

| 1,100,878 | Higgins et al. | June 23, 1914 |
| 1,376,768 | Hess | May 3, 1921 |
| 2,358,308 | Barnard | Sept. 19, 1944 |
| 2,492,870 | Kelsh | Dec. 27, 1949 |
| 2,583,371 | Guttman | Jan. 22, 1952 |
| 2,727,308 | Kuhn et al. | Dec. 20, 1955 |

FOREIGN PATENTS

| 386,713 | Germany | Dec. 14, 1923 |
| 276,795 | Great Britain | Sept. 8, 1927 |
| 666,870 | Germany | Oct. 29, 1938 |
| 527,528 | Great Britain | Oct. 10, 1940 |